US012614972B2

(12) United States Patent
Vancu et al.

(10) Patent No.: US 12,614,972 B2
(45) Date of Patent: Apr. 28, 2026

(54) SYSTEM FOR CONTROLLING AN INDUCTOR FREEWHEELING VOLTAGE

(71) Applicant: ABB Schweiz AG, Baden (CH)

(72) Inventors: Florian Vancu, Schlieren (CH);
Markus Fueglister, Muelligen (CH)

(73) Assignee: ABB Schweiz AG, Baden (CH)

( * ) Notice: Subject to any disclaimer, the term of this patent is extended or adjusted under 35 U.S.C. 154(b) by 195 days.

(21) Appl. No.: 18/392,291

(22) Filed: Dec. 21, 2023

(65) Prior Publication Data

US 2024/0120830 A1     Apr. 11, 2024

Related U.S. Application Data

(63) Continuation of application No. PCT/IB2022/054185, filed on May 5, 2022.

(30) Foreign Application Priority Data

Jun. 22, 2021     (EP) ..................................... 21180912

(51) Int. Cl.
*H02M 3/156*          (2006.01)
*H02H 7/09*           (2006.01)
(Continued)

(52) U.S. Cl.
CPC .............. *H02M 1/322* (2021.05); *H02H 7/09* (2013.01); *H02M 3/156* (2013.01); *H02P 6/32* (2016.02)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,191,562 B1 *   2/2001   Mueller ................. H02H 7/067
                                                              322/69
6,288,508 B1     9/2001   Taketomi et al.
                          (Continued)

FOREIGN PATENT DOCUMENTS

DE      102016219770 A1      4/2018
EP          1675245 A2       6/2006
                   (Continued)

OTHER PUBLICATIONS

European Patent Office, International Search Report in International Patent Application No. PCT/IB2022/054185, 3 pp. (Jul. 25, 2022).
(Continued)

*Primary Examiner* — Jeffrey A Gblende
(74) *Attorney, Agent, or Firm* — Fitch Even Tabin & Flannery LLP

(57)               ABSTRACT

A system for controlling an inductor freewheeling voltage includes first and second switches, a first diode, and an inductor. When open, the first switch connects a first terminal of the inductor with a power bus. The first switch is controlled by a first control signal. A first terminal of the first diode is connected to a ground, and a second terminal of the first diode is connected to the first terminal of the inductor. The first diode allows an electric current to pass from the ground to the first terminal of the inductor. When open, the second switch connects a second terminal of the inductor with the ground. A switch control circuit is controlled with a second control signal and keeps the second switch open or such that there is a voltage drop across the second switch.

5 Claims, 2 Drawing Sheets

(51) Int. Cl.
H02M 1/32 (2007.01)
H02P 6/32 (2016.01)

(58) Field of Classification Search
CPC ... G05F 1/445; G05F 1/66; G05F 1/40; G05F
1/42; G05F 1/44; G05F 1/462; G05F
1/52; G05F 1/56; G05F 3/10; G05F 3/16;
G05F 3/18; G05F 3/185; G05F 3/20;
G05F 3/26; G05F 3/30; G05F 3/205;
G05F 3/22; G05F 3/24; G05F 3/222;
G05F 3/242; G05F 3/225; G05F 3/227;
G05F 3/245; G05F 3/247; G05F 3/262;
G05F 3/265; G05F 3/267; G05F 1/575;
H02M 5/2573; H02M 1/081; H02M
5/293; H02M 7/12; H02M 3/10; H02M
3/125; H02M 3/13; H02M 3/135; H02M
3/145; H02M 3/15; H02M 3/155; H02M
3/156; H02M 3/157; H02M 3/158; H02M
1/346; H02M 3/1588; H02M 2003/1566;
H02M 3/1582; H02M 3/1584; H02M
2003/1557; H02M 1/0032; H02M 1/4225;
H02M 7/217; H02M 1/0025; H02M
1/0045; H02M 1/0009; H02M 1/08;
H02M 1/088; H02M 1/0048; H05B
39/048; B23K 11/24; H04B 2215/069
See application file for complete search history.

(56) References Cited

U.S. PATENT DOCUMENTS

| | | | | |
|---|---|---|---|---|
| 7,723,864 B2 * | 5/2010 | Zub | ........................ | H03K 17/08 |
| | | | | 307/85 |
| 9,281,813 B2 * | 3/2016 | Ivankovic | .............. | H03K 17/74 |
| 2004/0263219 A1 * | 12/2004 | Ozaki | .............. | H03K 17/04123 |
| | | | | 327/112 |

FOREIGN PATENT DOCUMENTS

| | | |
|---|---|---|
| EP | 2747287 A1 | 6/2014 |
| FR | 2944398 A1 | 10/2010 |

OTHER PUBLICATIONS

European Patent Office, Written Opinion in International Patent Application No. PCT/IB2022/054185, 8 pp. (Jul. 25, 2022).
European Patent Office, Extended European Search Report in European Patent Application No. 21180912.4, 11 pp. (Dec. 1, 2021).

* cited by examiner

SYSTEM FOR CONTROLLING AN INDUCTOR FREEWHEELING VOLTAGE

CROSS-REFERENCE TO RELATED APPLICATIONS

The instant application claims priority to International Patent Application No. PCT/IB2022/054185, filed May 5, 2022, and to European Patent Application No. 21180912.4, filed Jun. 22, 2021, each of which is incorporated herein in its entirety by reference.

FIELD OF THE DISCLOSURE

The present disclosure relates to an electrical circuit for controlling an inductor freewheeling voltage.

BACKGROUND OF THE INVENTION

A DC current needs to be controlled in the excitation winding of synchronous motors/generators. The current is increased by applying a positive voltage across it and it is controlled by a switch. In order to quickly discharge the current in this inductance, a negative voltage needs to be applied across it. Feeding the energy back into the DC bus is a common solution, but requires an active load consisting of a resistor and a switch to discharge the capacitors and prevent overvoltage. Other solutions include a resistor, which leads to a current dependent ramp-down voltage, or a voltage clamp placed parallel to the freewheeling switch.

U.S. Pat. No. 6,288,508B1 discloses a braking system for an electric motor operated vehicle including a system for providing both regenerative and reverse excitation braking and shifting between the braking modes in response to operator demand. Solution provided in this document discloses a deceleration of the motor by using said motor as a generator and either charges the battery or discharges its generated current through a resistive load so as to provide regenerative braking.

Document EP2747287A1 discloses an arrangement which has a free-wheeling circuit comprising a free-wheeling diode and a limiting element e.g. breakdown diode, that is connected parallel to a switching element e.g. MOSFET. Another switching element is connected in series with the circuit. A controller has an evaluation and controlling unit for synchronous controlling of the elements. The controlling unit is connected with a galvanically separated controller and a control input, where the controlling of the elements is carried out based on determined control supply voltage.

Document EP1675245A2 discloses a circuit arrangement for the rapid reduction of an induced current which can be used in particular in conjunction with a voltage regulator for a generator in a vehicle electrical system and causes an increase in the freewheeling voltage. Thus, in the shutdown of consumers in the excitation winding induced overvoltage can be rapidly reduced and the generator are thus quickly de-energized.

BRIEF SUMMARY OF THE INVENTION

The present disclosure describes embodiments that relate to a circuit for controlling an inductor freewheeling voltage which comprises fewer high-power components than solutions known from the state of the art.

The present disclosure describes a system for controlling an inductor freewheeling voltage comprising a first switch, a second switch, a first diode, an inductor. The first switch is connected such that, in open state, it will connect a first terminal of the inductor with a power bus and that the first switch is controlled by a first control signal. A first terminal of the first diode is connected to a ground, and a second terminal of the first diode is connected to the first terminal of the inductor. The first diode is connected such that it allows an electric current to pass from the ground to the first terminal of the inductor. The second switch is connected such that, in open state, it will connect a second terminal of the inductor with the ground. The system is characterized in that it comprises a switch control circuit, which is configured to be controlled with a second control signal, delivered to an input terminal of the switch control circuit, such that in a first state of the second control signal the switch control circuit keeps the second switch open and in a second state of the second control signal the switch control circuit keeps the second switch such that there is a voltage drop across the second switch.

In a preferred embodiment, the switch control circuit comprises a second diode configured to deliver, to the switch control circuit, the second control signal. In yet another embodiment the at least one from the first switch and the second switch is a unipolar transistor or IGBT transistor. In another embodiment the switch control circuit comprises a first resistor and a Zener diode connected such that a first terminal of the Zener diode is connected to the second terminal of the inductor, a second terminal of the Zener diode is connected to a first terminal of the first resistor, a gate terminal of the second switch, and the input terminal. A forward direction of the Zener diode is from the gate terminal of the second switch to the second terminal of the inductor, a second terminal of the first resistor is connected to the ground.

In a preferred embodiment, the switch control circuit comprises a second resistor, a third resistor, a fourth resistor, a third diode, a transistor and at least one Zener diode. A first terminal of a first Zener diode is connected to the second terminal of the inductor, a second terminal of a last Zener diode is connected to a first terminal of a third diode. All Zener diodes are connected in series, in the same direction and a forward direction of the Zener diodes if from the first terminal of the third diode to the second terminal of the inductor. A second terminal of the third diode is connected to a first terminal of the second resistor, and to a base terminal of the transistor. A forward direction of the third diode is from the second terminal of the last Zener diode to the first terminal of the second resistor. A second terminal of the second resistor is connected to the ground. A collector terminal of the transistor is connected to an auxiliary power supply configured to provide stable DC voltage. An emitter terminal of the transistor is connected to the input terminal and to a first terminal of the third resistor. A second terminal of the third resistor is connected to a first terminal of the fourth resistor, and to a gate terminal of the second switch. A second terminal of the fourth resistor is connected to the ground.

In yet another embodiment, the system comprising a capacitor connected such that a first terminal of the capacitor is connected to the gate terminal of the second switch and a second terminal of the capacitor is connected to the ground.

BRIEF DESCRIPTION OF THE SEVERAL VIEWS OF THE DRAWING(S)

DETAILED DESCRIPTION OF THE INVENTION

Figure 1:
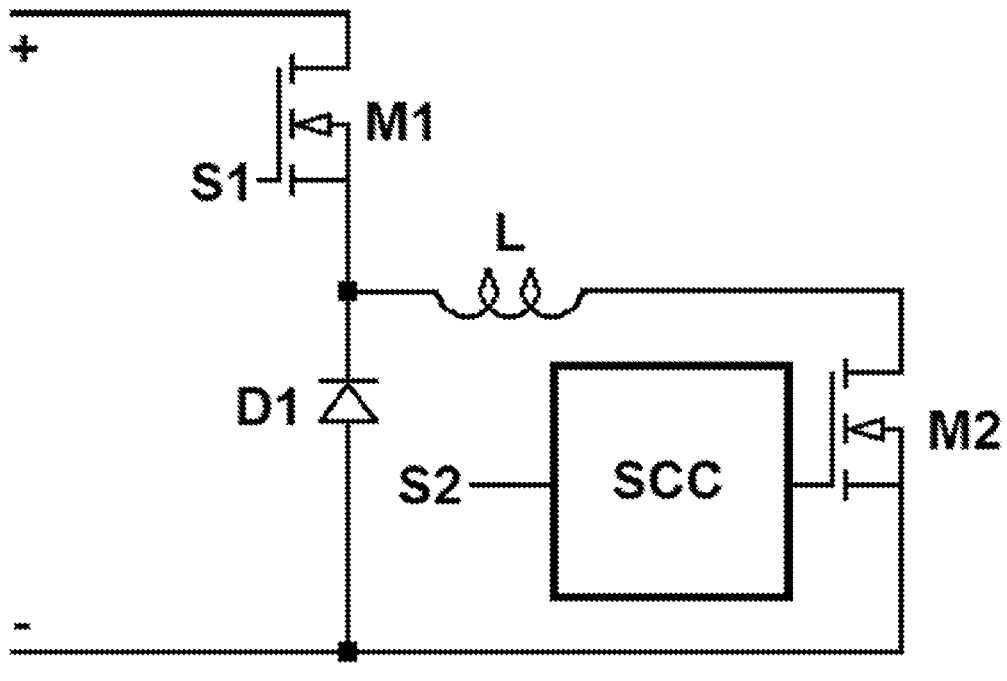
FIG. 1 is a diagram of a general circuit topology according to the present disclosure.

A general concept of a circuit in accordance with the disclosure is shown in FIG. 1. The novel implementation shown in its simplest form merges the functionality of the power switch and, preferably, the constant voltage load, in one component, namely switch M2. This reduces the power components count and the required heat sink area since only one power component to reduce a current is needed, that is switch M2.

During the current build-up phase both switches M1 and M2 shown in FIG. 1 are turned on – a first control signal S1 and a second control signal S2 are in a first state. A power bus + is connected through the first switch M1 with an inductor L which is further connected to a ground – by means of the second switch M2. Freewheeling is achieved by turning off the first switch M1 (by changing the state of the first control signal S1), forcing the current to flow through the freewheeling diode (first diode D1). When the current in the inductor L needs to be decreased, the gate voltage $v_{G\_M2}$ is set low due to change of the second control signal S2. This leads to a decrease of the gate voltage of the second switch M2. The second switch M2 starts to close, which leads to an increase of its drain-source voltage $V_{DS\_M2}$. A switch control circuit SCC prevent the second switch M2 from fully closing. In a preferred embodiment a constant voltage drop is achieved across the second switch M2 which makes adjusting the current easier. The person skilled in the art will know that other transistor types may be used in this application as the first switch M1 and/or the second switch M2 and transistors shown on FIG. 1-3 serves only as examples – bipolar, unipolar or IGBT transistors may be used in this application. In preferred embodiment a capacitor C2 is connected such that a first terminal of the capacitor C2 is connected to the gate terminal of the second switch M2 and a second terminal of the capacitor C2 is connected to the ground –. This capacitor C2 provides slower changes in a voltage across the second switch S2.

It should be noted that in figures and in the description there is the power bus +, which applies a positive voltage, and the ground –, which has a 0V potential. It should be noted that in other cases, in which, for example, there is the ground – and a negative power bus some components will be connected accordingly and overall circuit connections might change. The person skilled in the art will know how to adjust disclosed invention in such cases.

The switch control circuit SCC is a circuit which may be described as a signal converter which transforms the second control signal S2 into a signal which control the second switch M2 while preventing the second switch M2 from being fully closed. Hereinafter it is assumed that the second control signal S2 is a digital signal but it should be noted that it also may be an analog signal.

In the preferred embodiment the switch control circuit SCC comprises a second diode D2 configured to deliver, to the switch control circuit SCC, the second control signal S2. The second diode D2 provides a secured input and prevent applying high voltage/current to a source of the second control signal S2.

Figure 2:
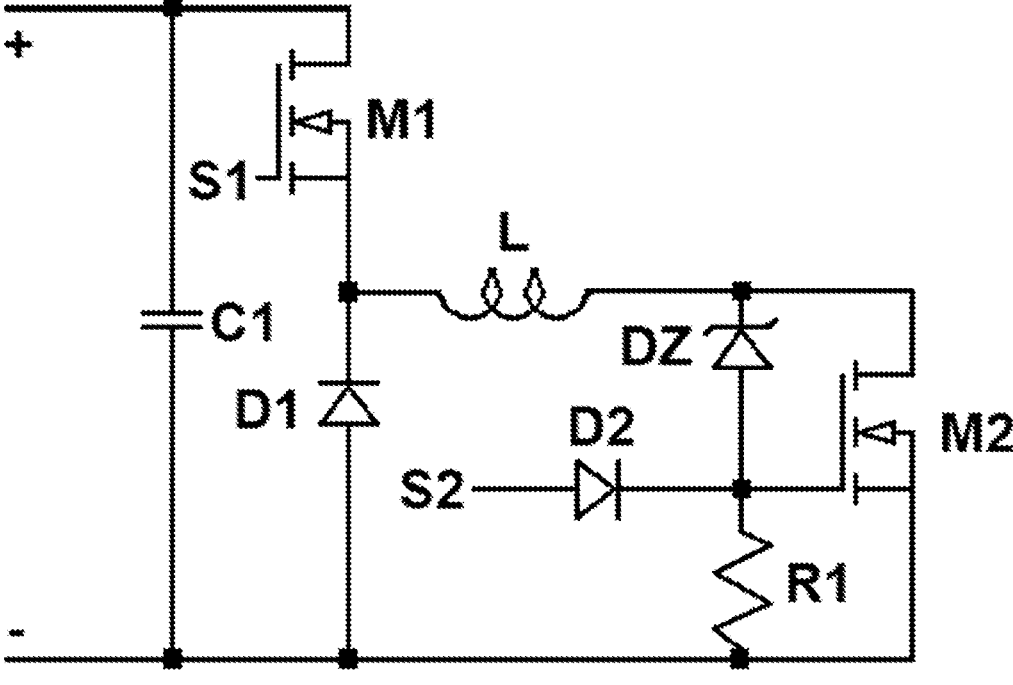
FIG. 2 is a diagram of an embodiment for a circuit in accordance with the disclosure.

FIG. 2 shows a simple implementation of the general concept of the present invention. In this circuit the switch control circuit SCC comprises a first resistor R1 and a Zener diode DZ connected such that a first terminal of the Zener diode DZ is connected to the second terminal of the inductor L, a second terminal of the Zener diode DZ is connected to a first terminal of the first resistor R1, a gate terminal of the second switch M2, and the input terminal. A forward direction of the Zener Diode is from the gate terminal of the second switch M2 to the second terminal of the inductor L, a second terminal of the first resistor R1 is connected to the ground –. In this implementation when the current in the inductor L needs to be decreased, the gate voltage $v_{G\_M2}$ is set low. This leads to a decrease of the gate voltage of the second switch M2, caused by the pull-down resistor R1. The second switch M2 starts to close, which leads to an increase of its drain-source voltage $V_{DS\_M2}$. Eventually the drain source voltage reaches the breakdown voltage of the Zener diode DZ, and the diode starts to conduct, preventing the second switch M2 from fully closing, and causing a constant voltage drop across its drain source junction.

The embodiments in accordance with the present disclosure enable, with the appropriate gating circuit, achieving the functions performed by the second switch M2 and the voltage clamp known from the prior art by using a single power component, removing the need for an additional high-power component. Additionally a capacitance value, as well as the voltage rating, of the DC stabilizing capacitor C1 are decreased, when used.

Figure 3:
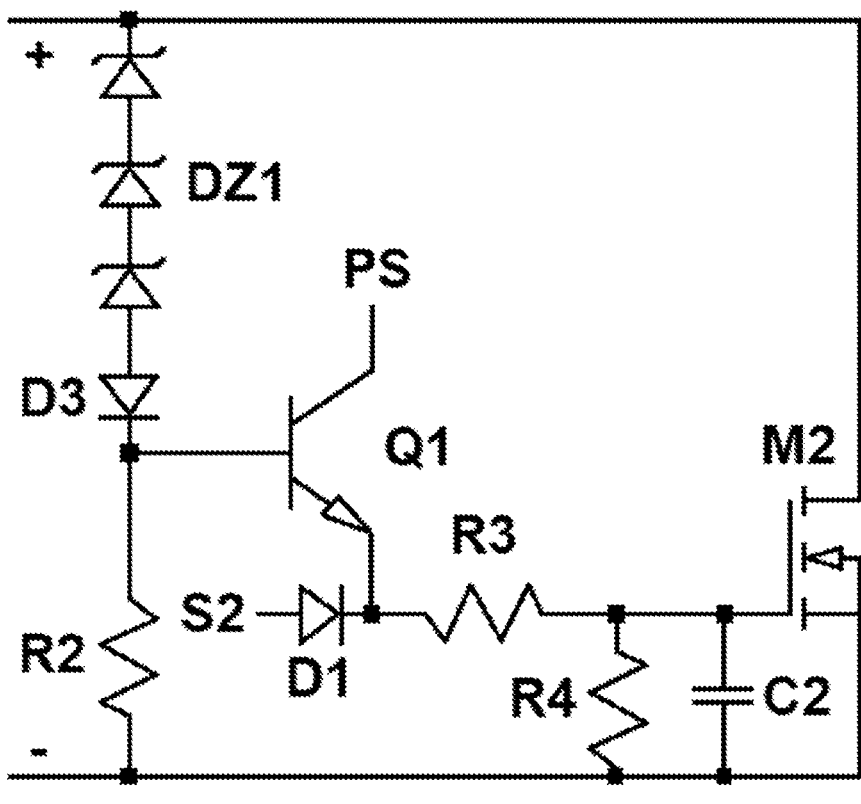
FIG. 3 is a diagram for a circuit with reduced standby losses in accordance with the disclosure.

In FIG. 3 a more complex circuit is presented (only the switch control circuit SSC and the second switch M2 are presented). In this embodiment a first terminal of a first Zener diode DZ1 is connected to the second terminal of the inductor L, a second terminal of a last Zener diode DZ1 is connected to a first terminal of a third diode D3. All Zener diodes DZ1 are connected in series, in the same direction and a forward direction of the Zener diodes DZ1 if from the first terminal of the third diode D3 to the second terminal of the inductor L. A second terminal of the third diode D3 is connected to a first terminal of the second resistor R2, and to a base terminal of the transistor Q1. A forward direction of the third diode D3 is from the second terminal of the last Zener diode DZ1 to the first terminal of the second resistor R2. A second terminal of the second resistor R2 is connected to the ground –. A collector terminal of the transistor Q1 is connected to an auxiliary power supply PS which is configured to provide stable DC voltage. An emitter terminal of the transistor Q1 is connected to the input terminal and to a first terminal of the third resistor R3, A second terminal of the third resistor R3 is connected to a first terminal of the fourth resistor R4, and to a gate terminal of the second switch M2, a second terminal of the fourth resistor R4 is connected to the ground –.

This adds an additional low-voltage, low-power transistor Q1. Its purpose is to reduce the current flow in the Zener diodes, and thus minimize the overall standby losses of the circuit. A disadvantage is the need for a stable auxiliary supply for the gating circuit.

It should be noted that in this embodiment the transistor Q1 is presented and described as a bipolar transistor. It should be noted that a unipolar transistor also may be used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims)

5 are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS

M1—first switch
M2—second switch
D1—first diode
D2—second diode
D3—third diode
DZ, DZ1—Zener diode
L—inductor
+—power bus
−—ground
S1—first control signal
S2—second control signal
R1—first resistor
R2—second resistor
R3—third resistor
R4—fourth resistor
Q1—transistor
C1—stabilizing capacitor
C2—capacitor
SCC—switch control circuit
PS—auxiliary power supply
What is claimed is:

1. A system for controlling an inductor freewheeling voltage, comprising:
a first switch;

6 a second switch, wherein at least one of the first switch and/or the second switch is a unipolar transistor or IGBT transistor;
a first diode;
an inductor; and
a switch control circuit,
wherein the first switch has an open state in which the first switch connects a first terminal of the inductor with a power bus, the first switch being controlled by a first control signal,
wherein a first terminal of the first diode is connected to a ground, and a second terminal of the first diode is connected to the first terminal of the inductor,
wherein the first diode is connected to permit an electric current to pass from the ground to the first terminal of the inductor,
wherein the second switch has an open state in which the first switch connects a second terminal of the inductor with the ground,
wherein the switch control circuit comprises a second resistor, a third resistor, a fourth resistor, a third diode, a transistor, and a plurality of Zener diodes,
wherein the plurality of Zener diodes is connected such that:
a first terminal of a first Zener diode from the plurality of Zener diodes is connected to the second terminal of the inductor;
a second terminal of a last Zener diode from the plurality of Zener diodes is connected to a first terminal of the third diode, wherein the plurality of Zener diodes are connected in series, in the same direction and a forward direction of the Zener diodes from the first terminal of the third diode to the second terminal of the inductor;
a second terminal of the third diode is connected to a first terminal of the second resistor, and to a base terminal of the transistor, wherein a forward direction of the third diode is from the second terminal of the last Zener diode of the plurality of Zener diodes to the first terminal of the second resistor,
a second terminal of the second resistor is connected to the ground, a collector terminal of the transistor is connected to an auxiliary power supply configured to provide stable DC voltage,
an emitter terminal of the transistor is connected to the input terminal and to a first terminal of the third resistor, a second terminal of the third resistor is connected to a first terminal of the fourth resistor, and to a gate terminal of the second switch, a second terminal of the fourth resistor is connected to the ground
is configured to be controlled with a second control signal that is delivered to an input terminal of the switch control circuit, such that in a first state of the second control signal the switch control circuit keeps the second switch open and in a second state of the second control signal the switch control circuit keeps the second switch such that there is a voltage drop across the second switch.

2. The system according to claim 1, wherein the switch control circuit comprises a first resistor and a Zener diode connected such that a first terminal of the Zener diode is connected to the second terminal of the inductor.

3. The system according to claim 2, wherein a second terminal of the Zener diode is connected to a first terminal of the first resistor, a gate terminal of the second switch, and the input terminal, wherein a forward direction of the Zener diode is from the gate terminal of the second switch to the second terminal of the inductor, and wherein a second terminal of the first resistor is connected to the ground.

4. The system according to claim 1, wherein the plurality of Zener diodes is connected such that:

a first terminal of a first Zener diode from the plurality of Zener diodes is connected to the second terminal of the inductor;

a second terminal of a last Zener diode from the plurality of Zener diodes is connected to a first terminal of the third diode, wherein the plurality of Zener diodes are connected in series, in the same direction and a forward direction of the Zener diodes from the first terminal of the third diode to the second terminal of the inductor;

a second terminal of the third diode is connected to a first terminal of the second resistor, and to a base terminal of the transistor, wherein a forward direction of the third diode is from the second terminal of the last Zener diode of the plurality of Zener diodes to the first terminal of the second resistor, a second terminal of the second resistor is connected to the ground, a collector terminal of the transistor is connected to an auxiliary power supply configured to provide stable DC voltage, an emitter terminal of the transistor is connected to the input terminal and to a first terminal of the third resistor, a second terminal of the third resistor is connected to a first terminal of the fourth resistor, and to a gate terminal of the second switch, a second terminal of the fourth resistor is connected to the ground.

5. The system according to claim 1, further comprising a capacitor connected such that a first terminal of the capacitor is connected to the gate terminal of the second switch and a second terminal of the capacitor is connected to the ground.

* * * * *